United States Patent [19]

De Wacker et al.

[11] Patent Number: 4,940,741
[45] Date of Patent: Jul. 10, 1990

[54] PROCESS FOR THE PRODUCTION OF HARDBOARD

[75] Inventors: Dennis R. De Wacker, Belle Mead; Leon Rosenberg, Bridgewater, both of N.J.

[73] Assignee: National Starch and Chemical Investment Holding Corporation, Wilmington, Del.

[21] Appl. No.: 208,949

[22] Filed: Jun. 17, 1988

[51] Int. Cl.⁵ ............................ C08L 3/02; C08L 3/10
[52] U.S. Cl. .................................... 524/47; 156/62.2; 264/109
[58] Field of Search ................... 264/109; 156/62.2; 428/326, 370, 387, 393, 327; 524/47

[56] References Cited

U.S. PATENT DOCUMENTS

| | | | |
|---|---|---|---|
| 2,508,341 | 5/1950 | Wilson | 260/17 |
| 3,472,803 | 10/1969 | Andres et al. | 524/224 |
| 3,627,723 | 12/1971 | Kealy et al. | 524/224 |
| 3,632,535 | 6/1972 | Gramera et al. | 260/17.4 |
| 3,644,262 | 2/1972 | Stehle et al. | 260/29.6 R |
| 3,658,769 | 4/1972 | Kline | 526/308 |
| 3,767,628 | 10/1973 | Kline | 526/305 |
| 3,769,248 | 10/1973 | Kovats | 260/17.4 ST |
| 3,808,161 | 4/1974 | Lipscomb, Jr. | 260/17.4 ST |
| 4,020,039 | 4/1977 | Dunn et al. | 524/445 |
| 4,035,329 | 7/1977 | Wiest et al. | 526/331 |
| 4,061,610 | 12/1977 | Glowaky et al. | 260/17.4 ST |
| 4,061,611 | 12/1977 | Glowaky et al. | 260/17.4 ST |
| 4,213,892 | 7/1980 | Scott | 525/350 |
| 4,238,438 | 12/1980 | Laughinghouse et al. | 264/119 |
| 4,239,568 | 12/1980 | Iacoviello | 156/72 |
| 4,253,994 | 3/1981 | Zakaria et al. | 524/526 |
| 4,322,322 | 3/1982 | Lambrechts et al. | 524/734 |
| 4,452,939 | 6/1984 | Parker et al. | 524/551 |
| 4,481,337 | 11/1984 | Burlett et al. | 525/340 |
| 4,517,240 | 5/1985 | Tracton et al. | 428/326 |
| 4,521,574 | 6/1985 | Patterson et al. | 526/204 |
| 4,532,295 | 7/1985 | Brabetz et al. | 524/827 |
| 4,560,724 | 12/1985 | Brabetz et al. | 524/734 |

FOREIGN PATENT DOCUMENTS

| | | | |
|---|---|---|---|
| 0021542 | 1/1981 | European Pat. Off. | |
| 60-002 | 4/1985 | Japan | 524/426 |
| 0703005 | 1/1954 | United Kingdom | |

Primary Examiner—Jan H. Silbaugh
Assistant Examiner—Mary Lynn Fertig
Attorney, Agent, or Firm—Edwin M. Szala; Ellen T. Dec

[57] ABSTRACT

A one-step process for simultaneously compressing and tempering fiberboard panel, which includes the step of applying to the panel prior to compression thereof an aqueous treating composition which comprises a polyvinyl acetate emulsion and optionally up to 40% of a hydrocarbon emulsion, up to 3% of a fluid, water-soluble organosilicone polymer, or up to 5% by weight of a starch crosslinking agent. The polyvinyl acetate emulsion is prepared in the presence of 6–10% by weight of a starch stabilizer selected from the group consisting of derivatized starches and/or converted starches and 0.5–1.5% of a surfactant. The preferred emulsions are polymerized in the presence of alkenyl succinate starches, most preferably octenyl succinate waxy maize starches.

16 Claims, No Drawings

PROCESS FOR THE PRODUCTION OF HARDBOARD

BACKGROUND OF THE INVENTION

This invention relates to an improved process for preparing fiberboard having heat resistance and improved releasability and to the treated fiberboard thus produced. Fiberboards (sometimes called pressboards or hardboards) are boards manufactured from cellulosic fibers interfelted, preferably with a binding material, to produce an initial adhesive bond among the fibers. In a typical procedure, the wet interfelted panels are shaped and cut to the approximate desired dimensions (ordinarily to form a semi-hard board) and transferred to a drying and baking oven wherein the remaining moisture is evaporated and the boards are baked to set the binders therein. To allow the fiber panel to be released from the platen and the press for subsequent compression to size, the panel is treated prior to drying and compression with a thermoset resin blend. An additional treatment of the basic board for water resistance (tempering) is often carried out with various combinations of polymeric materials and drying oils. Thus, the compressed, hot board may be immersed in a bath of a siccative material such as a drying oil or drying oil blend of oxidized resins so that the surface and edges of the board are impregnated with up to 6% of the oil. The treating oil may also be applied by spraying or roll coating. The impregnated board is then baked at high temperature to oxidize (polymerize) the drying oil to a tough, insoluble form to yield the tempered fiberboard in final form. The fiberboard exhibits greatly improved physical properties such as resistance to moisture, strength, and hardness, possesses paintability and machinability, and is mostly used in applications in which it is likely to be exposed to external conditions of weather or dampness.

U.S. Pat. No. 4,517,240 (issued May 14, 1985 to Arthur A. Tracton et al.) discloses a one-step process for preparing fiberboard wherein the separate applications of hydrocarbon resins for release properties and a drying oil for water-resistance are replaced by a one-step application of an aqueous composition which provides water-resistance and releasability equal to or better than the tempered fiberboard of the prior art. The aqueous treating composition comprises about 3–20% by weight of an acrylic or vinyl acetate emulsion or solution polymer and about 0.05–3.0% by weight of a fluid, water-soluble organosilicone copolymer of dimethylpolysiloxane polyoxyalkylene ether wherein the alkylene moiety is ethylene, propylene or mixtures thereof.

U.S. Pat. No. 4,238,438 (issued Dec. 9, 1980 to Gerald F. Laughinghouse et al.) discloses an improved dry formed method for making hardboard. The coating composition which is applied to the surface fibers of the mat comprises 62–95% water, 4–25% of a hydroxy radical-containing compound having a boiling point of from 100°–316° C. (212°–600° F.) and selected from the group consisting of alcohols and their esters, and from 1–25% polyvinyl acetate. The mat is then pressed for a time and at a temperature and pressure effective to consolidate the fibers and permanently bind them by virtue of the glue system, the glue system having been mixed with the fibers prior to formation of the mat.

Water-soluble starches, e.g., boiled potato or corn starch preferably reacted with 2–5% ethylene oxide or a similar oxide, are used as extenders in barrier coating compositions consisting essentially of a water-soluble, predominantly acrylamide polymer and a hydrophilic-hydrophobic vinyl polymer containing 25–75 mole % of styrene linkages. The coating composition is used on fibrous cellulosic materials such as paper, paperboard, and hardboard such as "Masonite". See U.S. Pat. No. 3,808,161 issued April 30, 1974 to O. M. Lipscomb. The coating, with or without the starch (up to 8 parts by weight of a water-soluble starch per part by weight of the mixture of polymers), improves holdout of the primer.

Various derivatized or converted starches have been used as emulsifers or colloids in vinyl ester polymerizations. For example, oxidized starches from any vegetable source and waxy starches have been used as protective colloids during vinyl acetate emulsion polymerization. The resulting latices are particularly useful as an adhesive for affixing backing pads to carpeting. Other end uses include paper coatings, crease-resistant finishes for textiles, paperboard adhesives, and adhesive bases for paint, and aids in pigment dyeing. See U S. Pat. No. 3,632,535 issued Jan. 4, 1972 to R. E. Gramera et al.

Starch colloids used as stabilizers in aqueous vinyl acetate (co)polymer emulsions include hydroxyalkyl starches (e.g., hydroxyethyl and hydroxypropyl starch) and carboxylated starches (e.g., carboxymethyl starch), and/or methyl- -D-glucoside. The starches stabilize the emulsion, prevent precipitation at elevated temperatures, and in the presence of borax in solution improve the tensile strength of the polymer films. See U.S. Pat. No. 3,769,248 issued Oct. 30, 1973 to L. P. Kovats.

Starch esters and half-esters, preferably those derived from a low molecular weight hydrolyzed starch and/or its derivatives which are reacted with at least about 0.25 mole of at least one cyclic anhydride of a polycarboxylic acid for each anhydroglucose unit are used as dispersants in paints and coatings. Typical esters include the succinate and octenyl succinate. See U.S. Pat. No. 4,061,610 issued December 6, 1977 to R. C. Glowaky. Low molecular weight mixed starch esters, e.g , starch acetate-succinate or propionate-succinate, are also useful as dispersants in aqueous coating compositions comprising polymeric resin binders and pigments. See U.S. Pat. No. 4,061,611 issued December 6, 1977 to R. C. Gloaky et al.

Hydroxypropyl and/or hydroxyethyl starches are used as protective colloids in the preparation of water-containing vinyl acetate (co)polymer dispersions. Emulsifiers are also used in the polymerization. The resulting dispersions are useful as adhesives in the wood and paper industries, in coatings for paper, in the paint industry, and as a reinforcing for book backs. See U.S. Pat. 4,322,322 issued March 30, 1982 to P. F. T. Lambrechts et al.

Cyanoalklated, hydroxyalkylated, and carboxyalkylated starches are used as protective colloids in the preparation of aqueous polymer dispersions prepared from vinyl esters and up to 50% by weight of another monomer. The resulting dispersions can be used as adhesives for paper, foil and wood, as paint, as textile or paper fillers, in the construction industry as an adjuvant to hydraulically setting materials, especially stable cement and concrete materials, and particularly for the preparation of redispersible plastic powders suitable for wallpaper paste. See U.S. Pat. No. 4,532,295 issued July 30, 1985 to H. Brabetz et al.

Unmodified and/or derivatized starches are useful as protective colloids in the preparation of aqueous polymer dispersions, e.g., those prepared from styrene, acrylate, methacrylate, acrylonitrile, methacrylonitrile, dienes, vinyl esters including vinyl acetate, allyl esters, and vinyl halides. Suitable starches contain not more than 30% by weight of amylose and include unmodified gel starches, i.e., starches made soluble by boiling in water, and/or hydrolyzed starches (e.g., dextrins).

SUMMARY OF THE INVENTION

The present invention provides a one-step process for simultaneously compressing and tempering a fiberboard panel, which comprises the step of applying to the panel prior to compression thereof an aqueous treating composition which comprises a polyvinyl acetate emulsion, characterized in that the polyvinyl acetate emulsion is prepared in the presence of 6–10% by weight of a starch stabilizer selected from the group consisting of a derivatized starch, a converted starch, and a derivatized and converted starch and 0.5–1.5% of a non-ionic, cationic, or anionic surfactant; the stabilizer and surfactant percentage being by weight based on total weight of the monomer. The aqueous treating composition may also contain up to 40%, preferably 1–30%, of a hydrocarbon emulsion, and/or up to 20%, preferably 1–5%, of a crosslinking agent. Depending upon the optional ingredient selected, the treating composition will comprise 60–99.5% of the polyvinyl acetate polymer. Particularly useful are polyvinyl acetate emulsions polymerized in the presence of an alkenyl succinate starch, preferably an octenyl succinate waxy maize starch, and 1–1.5% of a non-ionic surfactant, preferably an adduct of octyl phenol with 30 moles of ethylene oxide.

DESCRIPTION OF THE PREFERRED EMBODIMENTS

The treating composition herein is an aqueous emulsion prepared by the emulsion polymerization of vinyl acetate in the presence of 6–10%, based on the weight of monomer, of a dispersed or dissolved derivatized and/or converted starch as an emulsion stabilizer and 0.5–1.5% of a surfactant, preferably 1.0–1.5% of a non-ionic surfactant or 0.5%–1% of an anionic or a cationic surfactant. The polymerization is carried out in the presence of an at least partially water-soluble free radical initiator. If the starch stabilizer is an anionic starch, an anionic surfactant is used, whereas if the starch stabilizer is cationic starch, a cationic surfactant is used. The resulting emulsions are characterized by low grit, low viscosity, and good stability toward agglomeration and settling. The starch stabilizer also improves the heat resistance of the polyvinyl acetate and provides good non-blocking characteristics.

Suitable starches for use as stabilizers in the polyvinyl acetate emulsion polymerization include derivatized starches, converted starches, and derivatized and converted starches, but do not include dextrins. If the above suitable starches are lightly crosslinked, they may be suitable provided the crosslinking does not interfere with dispersion of the starch in the emulsion polymerization process.

Typical starch derivatives include substituent groups such as hydroxyalkyl ether groups (e.g., hydroxypropyl ether groups), carboxyalkyl ether groups, amino groups (e.g., diethylaminoethyl ether groups), and quaternary amine groups (e.g., 3-(trimethylammonium chloride) groups introduced by reaction with suitable derivatizing reagents. Also suitable are esters such as starch acetates prepared by reaction with acetic anhydride.

Converted starches may be prepared by the action of acids, enzymes, oxidizing agents, and/or heat. Acid-hydrolyzed starches are often referred to as fluidity or thin-boiling starches. Oxidized starches are often referred to as chlorinated starches because of the reagent used in their preparation, although no chlorine is chemically bound to the starch. As discussed above, the more highly converted starches such as dextrins, which are prepared by heat treatment, are not useful herein.

The above starch modification procedures, i.e., derivatization, conversion, and crosslinking are conventional and well-known to those skilled in the art and described in such publications as "Handbook of Water-Soluble Gums and Resins", Robert L. Davidson (Editor), Chapter 22: Starch and Its Modifications by M. W. Rutenberg, McGraw Hill Book Company (New York 1980). See pages 22-37 to 22-47 for a discussion of derivatization and 22-30 to 22-34 for a discussion of conversion.

The modified starches useful herein include starch derivatives containing an ether, simple ester, or half-acid ester substituent with a saturated or unsaturated hydrocarbon chain of at least 5, preferably 5–22, carbon atoms. Simple esters include esters derived from monofunctional acids (e.g., monocarboxylic or monosulfonic acids) as distinguished from half-acid esters having pendant carboxyl groups or acid radicals derived from an anhydride of a polycarboxylic acid.

The applicable starch bases which may be so modified include any amylaceous substance as well as starch derivatives including hydrolyzed, oxidized, esterified, and etherified starches. The starches may be derived from any sources including, for example, corn, high amylose corn, wheat, potato, tapioca, waxy maize, sago or rice. The preferred starch source is waxy maize. Examples of suitable derivatization include acetylation, hydroxyalkylation, carboxymethylation, sulfoalkylation and sulfosuccination. Flours may also be used as a starch source.

Alkenyl succinate starches which may be used herein are prepared by reaction of alkenyl-succinate anhydrides (A.S.A.) with either granular or dispersed starches. The preparation of the A.S.A. reagents and the resulting starch derivatives are described in U.S. Pat. No. 2,661,349 issued Dec. 1, 1953 to Caldwell et al. The general reaction between A.S.A. reagents and starch may be depicted as follows:

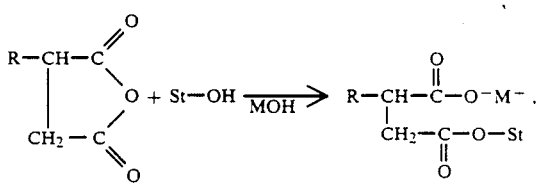

where St-O represents the polysaccharide fragment an M is a metal cation. The type of R group may be selected from branched or straight chain aliphatic substituents. R may thus be selected from the group consisting of R'—CH=CH—CH$_2$—,

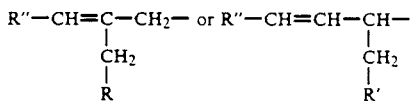

where R' and R" may be the same or different and are selected from the group consisting of $CH_3-(CH_2-)_n-$, where n equals 1-20.

The most common types of alkenyl succinic anhydride (A.S.A.) reagents and the corresponding starch derivatives may be represented as follows:

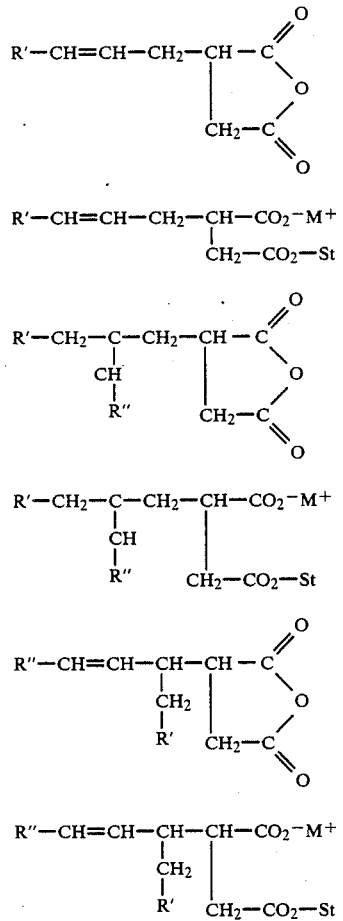

Starch esters useful herein are represented by the formula

St-O-A wherein St-O represents a starch molecule and A is an ester or half-ester with a saturated or unsaturated hydrocarbon chain of at least 5 carbon atoms, preferably a $C_5-C_{22}$ alkyl or alkenyl group.

Starch ethers useful herein include those prepared using the etherifying reagents described in the U.S. Pat. No. 2,876,217 issued on March 3, 1959 to E. Paschall which comprise the reaction product of an epihalohydrin with a tertiary amine. The amine may have the structure

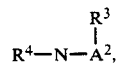

wherein $R^3$ and $R^4$ are independently H or a $C_1-C_4$ alkyl and $A^2$ comprises a hydrocarbon chain of at least 5, preferably 5-14, carbon atoms.

Starch ethers useful herein also include those prepared using the etherifying reagents described in U.S. Pat. No. 2,813,093 issued Nov. 12, 1957 to C. Caldwell et al. which comprise tertiary amine halides containing a $C_5$ or greater alkyl or alkenyl groups as one of the amine substituents.

The preferred starch ethers useful herein are represented by the formula

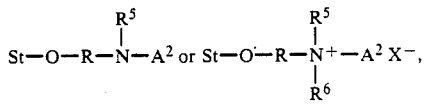

wherein St-O represents a starch molecule. R is an alkylene or hydroxyalklene group, $R^5$ and $R^6$ are independently H or $C_1-C_4$ alkyl, $A^2$ comprises a hydrocarbon chain of at least 5 carbon atoms and X is a halide (e.g., bromide or chloride). $A^2$ is most preferably a $C_5-C_{22}$ alkyl or alkenyl group and R is most preferably a $C_2-C_4$ group.

The starch etherification or esterification reactions may be conducted by a number of techniques known in the art and discussed in the literature employing, for example, an aqueous reaction medium, an organic solvent medium, or a dry heat reaction technique. See, for example R. L. Whistler, Methods in Carbohydrate Chemistry, Vol. 4, 1964 pp. 279-311; R. L. Whistler, et al. Starch:Chemistry and Technology, 2nd Ed. 1984, pp. 311-366; and R Davidson, N. Setting, Water Soluble Resins, 2nd Ed., 1968, Chapter 2. The hydrophobically modified starch derivatives herein are preferably prepared employing an aqueous reaction medium at temperatures between 20 and 45° C. For use herein the starch derivatives may be produced either in gelatinized or ungelatinized form. The advantage of having the derivative in ungelatinized form is that it may be filtered, washed and dried, and conveyed to the mill in the form of a dry powder.

The molecular weight of the applicable starches may be varied by performing the derivatization on the native starch or a converted starch prepared by acid hydrolysis, enzyme conversion, or oxidation. The preferred starch emulsifiers are a waxy maize starch treated with up to about 3% octenyl succinic anhydride, most preferably 3%. It will be understood that the proportion of etherifying or esterifying reagent used will vary with the particular reagent chosen (since they naturally vary in reactivity and reaction efficiency), and the degree of substitution desired. Suitable treatment levels are 1-20%, preferably 3-10%, A.S.A. reagent, based on the dry starch. The preferred derivatives are derived from the third type of A.S.A. reagents where R' is $CH_3-$, R" is $CH_3(CH_2)_n-$, and n is 7-9 and derived from the first type of reagent where R' is $CH_3-(CH_2)_n-$ and n is 5-9. In general, a starch derivative made with 1% of the reagent, based on the weight of the starch may be used; however, preferred ranges are on the order of 3%.

It will be recognized that there is a wide design latitude in utilizing these derivatized and/or converted starches as protective colloids in place of either conventional starches or polyvinyl alcohol. Thus, the molecular weight of the starch derivative may be varied somewhat to provide certain viscosity effects in the emulsion; a lipophilic group can be included to provide better emulsification, which will impact the particle size of the emulsion and the rate of polymerization. Further, the plant source from which the starch is derived may be varied to produce certain rheological and adhesive properties in the final emulsion.

The vinyl acetate emulsions are prepared using conventional polymerization procedures wherein the monomer is polymerized in an aqueous medium in the presence of the derivatized and/or converted starch using a free radical catalyst. The aqueous system is maintained by a suitable buffering agent, if necessary, at a pH of 2-7. If a batch process is used, the vinyl acetate is suspended in water and thoroughly agitated while the mixture is gradually heated to polymerization temperature. The homogenization period is followed by a polymerization period during which the catalyst, which consists of a main catalyst or initiator, and which may include an activator, is added incrementally or continuously. If the slow addition procedure is employed, the vinyl acetate is added gradually throughout the polymerization reaction. In either case, the polymerization is performed at conventional temperatures of from about 21°-100° C. (70°-212° F.), preferably from 48°-79° C. (120°-175° F.) for sufficient time to achieve a low monomer content. For example, from 0.5 to about 10 hours, preferably from 2 to about 6 hours, is required to produce a latex having less than 1.5%, preferably less than 0.5% unreacted monomer.

The polymerization is typically initiated by a free radical initiator such as water-soluble peracid or salt thereof, e.g., hydrogen peroxide, peracetic acid, persulfuric acid, or the ammonium or alkali metal salts thereof, e.g., ammonium persulfate, sodium peracetate, lithium persulfate, potassium persulfate, sodium persulfate and the like. Alternatively, organic peroxides such as benzoyl peroxide, t-butyl hydroperoxide, and the like may also be employed. A suitable concentration of the initiator is 0.05-5.0%, preferably 0.1-3%, by weight of monomer.

The free radical initiator can be used alone and thermally decomposed to release the free radical initiating species or can be used in combination with a suitable reducing agent in a redox couple. The reducing agent is typically an oxidizable sulfur compound such as an alkylene metal methyl bisulfate and pyrosulfite, e.g., sodium metabisulfite, sodium pyrosulfite, and the like. The amount of reducing agent that can be employed throughout the polymerization generally varies from about 0.1-3 weight % of the amount of monomer.

The ionic surfactants useful herein are conventional and disclosed in U.S. Pat. No. 3,287,305. Typically they are used in amounts of 0.5-6% by weight based on polymer solids. Suitable nonionic surfactants include polyglycol ethers of a fatty acid, fatty amine, or fatty alcohol, octylphenol polyglycol ether, and polyhydric alcohol partially esterfied with a higher fatty acid. If an anionic starch is used as the stabilizer, an anionic surfactant is used. Conversely, if a cationic starch is used as the stabilizer, a cationic surfactant is used. Such surfactants are conventional and known to those skilled in art.

The derivatized and/or converted starch may be used in the form of a cold-water soluble powder, in which case it is dissolved in water prior to addition to the polymerization reactor. Alternatively, the starch may be used in granular form in which case it is generally slurried in water at a 10-40% solids level, jet-cooked or pressure batch-cooked and added as a dispersion to the reactor. The starch is added at a total solids level of from about 1-10% by weight of the monomers, with the higher levels being required if batch polymerization procedures are employed. Amounts in excess of 10% can be used, with the maximum amount being dependent upon the desired viscosity as well as the particle size and other components added to the coating composition.

The derivatized and/or converted starch used in the polymerization can also be added to the initial charge or a portion of the emulsifier, e.g., from 25-90% thereof, can be added continuously or intermittently during polymerization. The emulsions are produced and used at relatively high solids contents, e.g., between 35 and 70%, although they may be diluted with water if desired. The preferred emulsions will contain 4-60%, most preferably 50-60% solids by weight.

In most instances, the composition will be formulated to contain about 60 to 100% by weight of the homopolymer. The compositions applied to the fiber web must have a viscosity which is operable for the type of application being used (e.g., spraying, roll coating, and the like). The amount applied should be effective to coat the web and impart heat resistance and platen release. If the composition is too thin, it will soak into the mat and the surface will not be effectively and uniformly covered. If the composition is too thick, the coating may build up on the platen interfering with release.

The term fiberboard as used herein is meant to include not only hardboards, usually defined as having a specific gravity of about 1 or greater or having a density of at least about 55 lb. per. cu. ft., but also medium density fiberboards (semi-hardboard) usually having a density range of about 5-50 lb. per. cu. ft. and low density fiberboards usually having a density of about 9-25 lb. per. cu. ft. Preferred herein are the semi-hardboards and hardboards, as these are the fiberboards most commonly encountered for exterior use for which the present process is particularly advantageous.

The treating compositions herein are useful in the four basic processes typically used for preparing fiberboard, i.e., a wet process, semi-wet process, dry process, and semi-dry process which are described in Encyclopedia Polymer Science and Technology, Vol. 4, pp. 84-89, 1966 (Interscience Publishers, John Wiley and Sons, Inc., New York). They are particularly suitable for the wet or semi-wet processes. In the wet process the wet fiber mat is conveyed into the hot press. In the semi-wet process the mat is hot wet pressed but is first completely dried to a low moisture content in a low density form and then hot pressed to the final density. The compositions are applied to the fiber panel after it has been shaped and cut to the desired dimensions and oven-treated in the dry, semi-dry or semi-wet processes, but before it has been compressed to final dimensions. The composition described above is applied to the formed panel by any suitable techniques such as spraying or by metering the composition onto the web by a roll, as by, e.g., wipe rolling, direct roll coating, or reverse roll coating.

In preparing the treating composition it has been found convenient to prepare a concentrate of the starch-stabilized vinyl acetate polymer emulsion together with the desired optional ingredients. The concentrate is thereafter diluted with water to bring the emulsion within the ranges specified above and to provide the desired viscosity. Alternatively, any optional ingredients may be conveniently added to the diluted composition. The amount of treating composition to be applied to the fiberboard will vary depending on a number of factors including, for example, the concentration of the polymer emulsion, the porosity of the fiberboard surface, the degree of water-resistance desired, and the like. In view of the large number of factors, it can be understood that the amount of treating composition which may be applied can vary within a wide range In most applications, about 0.6 to 1.8 dry grams of the treating composition should be applied per one square foot of fiberboard surface. Practitioners in the art will have no difficulty in determining the amount necessary in individual cases.

After the application of the composition to the web, the panel is compressed in a hot platen press to form the fiberboard of necessary density. It may be dried in a drying and baking oven prior to compression. The thus treated panel is characterized by its ready release from the platen to the press, which releasability is ordinarily equivalent to or improved over the better thermosets because most thermosets are phenolic condensation reactions which give off formaldehyde or contain free formaldehyde. It is better than the non-thermoset acrylic or vinyl acetate emulsion or solution polymers of U.S. 4,517,240 (cited previously) in that it does not require the separate addition of a silicone component. The finished fiberboard herein will have a heat resistance comparable to fiberboard prepared by the two-step process of the prior art and will have a satisfactory water-resistance.

The following examples illustrate several embodiments of the present invention. All parts and percentages are given by weight and all temperatures in degree Celcius unless otherwise noted.

The following procedure is used to determine the amount conversion of the starch.

Water Fluidity (W.F.):

This is measured using a Thomas Rotational Shear-Type Viscometer (manufactured by Arthur H. Thomas Co., Philadelphia, Penn. 19106) is accordance with standard procedures such as are disclosed in U.S. Pat. No. 4,499,116 issued Feb. 12, 1985 to Zwiercan et al., the disclosure of which is incorporated herein by reference.

The following test procedures were used to evaluate the properties of the treated fiberboard:

Platen Test:

A treated fiberboard panel prior to compression is introduced into a small press between two platens. The panel is compressed and the release properties are observed by noting whether, when the platens are removed, the fiberboard adheres to the platens. The absence of any adherence is rated as "excellent" (E) while the greatest amount of adherence is rated as "poor" (P); "good" (G) and "fair" (F) are intermediary ratings. For purposes herein a rating of at least good is acceptable for the treated fiberboard. Unless otherwise noted standard conditions for the platen test are 246° C. (475° F.) for 1.5 minutes using 310 psi.

Tape Test:

A piece (approximately 1" by 4") of pressure sensitive adhesive tape (Scotch Brand #600 tape by 3M) is adhered with finger pressure to the treated final fiberboard and then pulled off, A satisfactory (S) rating indicates that essentially no fiber adhered to the tape. While "failure" (F) indicates adherence of many fibers. Thus, a satisfactory rating signifies acceptable release properties for the treated composition herein.

Primer Adhesion Test:

The following test procedures were used to evaluate the converted starches and the aqueous emulsions.

A pigmented coating primer, i.e., 50% PVC (pigment volume concentration) using a polyvinyl acetate/acrylic copolymer was brushed onto the surface of the treated fiberboard, and the sample was air dried overnight. A portion of the surface was scribed using an Erichsen Crosshatch Cutter Model #GE-2951-4 (available from Gardner Division of Pacific Scientific of Bethesda, Md.) or a like cutter. The tape adhesive test was carried out on the scribed and unscribed surface. The results are given as excellent (E), good (G), and poor (P).

Water Resistance Test:

Several drops of water are separately placed onto the fiberboard. The water was allowed to remain on the fiberboard for one hour before the evaluation. A rating of excellent (E), good (G), fair (F), and poor (P) is used. For those coatings where water-resistance is required a recovery of G or above is considered acceptable. The term recovery refers to fiber puffing with slight to very slight puffing being considered acceptable.

EXAMPLE I

This example describes the preparation of a starch stabilized polyvinyl acetate emulsion using a slow-addition polymerization procedure and octenylsuccinic anhydride treated starch as a protective colloid. A reactor with a four-neck flask was fitted with a thermometer, condenser, agitator, subsurface nitrogen purge, and suitable addition funnels. The following charges were prepared:

(A) 61.67 parts water, 5 parts of a waxy maize starch derivatized with 3% octenylsuccinic anhydride (OSA), 0.125 part 25% sodium hydroxide solution, 0.6 part sodium bicarbonate, and 0.6 part soldium persulfate;
(B) 16.67 parts vinyl acetate;
(C) 8.33 parts water, 0.125 part sodium persulfate, and 0.583 part t-butyl hydrogen peroxide;
(D) 8.33 parts water, 0.5 part sodium formaldehyde sulfoxalate, and 0.125 part sodium bicarbonate;
(E) 80 parts vinyl acetate.

A dispersion of initial charge A was formed in the reactor. Agitation was started and charge B was added. The mixture was heated to 50° C. and purged with nitrogen for 15 minutes. Charges C and D were slow-added over 4.5 hours. Five minutes after initiation, the temperature was raised to 75° C. over 30 minutes. Charge E was then slow-added over 3 hours. The mixture was held at 78°–80° C. until charge of the initiators was completed, then cooled and discharged. The emulsion was designated Emulsion A.

EXAMPLE II

The emulsion polymerization was carried out as above using other starch stabilizers and surfactants. The emulsion compositions were as follows:

Emulsion B - 100 parts vinyl acetate/8 parts starch stabilizer/1.5 parts Triton X-305 (70%) (a nonionic surfactant available from Rohm and Haas which is an adduct of octyl phenol with 30 moles of ethylene oxide). The stabilizer was an waxy maize starch derivatized with 7% propylene oxide (PPO), enzyme-converted to a water fluidity of 85 W.F., jet-cooked, and spray-dried.

Emulsion C. - 100 parts vinyl acetate/8 parts starch stabilizer/1.5 parts Triton X-305 (70%) surfactant. The stabilizer was a tapioca starch converted to a water fluidity of 85 W.F. with sulfuric acid ($H_2SO_4$) and derivatized with 7% propylene oxide. (PPO).

Emulsion D - 100 parts vinyl acetate/8 parts starch stabilizer/1.5 parts Triton X-305 (70%). The stabilizer was a waxy maize starch converted to a water fluidity of 85 W.F. with hydrochloric acid.

Emulsion E - 100 parts vinyl acetate/8 parts starch stabilizer/1.5 parts Triton X-305 (70%). The stabilizer was corn starch oxidized with sodium hypochloride to a carboxyl content (COOH) of about 0.5%.

Emulsion F - (comparative) 100 parts vinyl acetate/8 parts starch stabilizer/1.5 parts Triton X-305 (70%) surfactant. The dextrin was acid-hydrolyzed pyro waxy maize dextrin having an ABF (anhydro borated fluidity) of about 2.2–2.5.

The treated fiberboard composed of interfelted lignocellulosic fibers was prepared by the process described herein.

The treating composition was sprayed on the upper and lower surfaces of a preformed cellulosic mat (15.2 cm by 15.2 cm by 1.3 cm) prior to compression. One gram of the treating composition as solids was used for each side of the preformed mat. The treated panels were then heated in an oven at about 95° C. for 2 minutes and thereafter pressed, without cooling, at about 246° C. (475° F.) and 310 psi for 1.5 minutes. Each fiberboard panel was evaluated for platen release, tape adhesion, primer adhesion and water-resistance. The results are given in Table I.

The results show that all of the derivatized, converted, and derivatized and converted starches provided good heat resistance (as indicated by the platen release test and surface appearance of the board after release), satisfactory water-resistance (as shown by the one hour spot test and recovery), and excellent adhesion (as shown by the tape and primer adhesion tests). The dextrin was fair to unsatisfactory in most tests having a poor surface appearance and tape adhesion. The control was poor in all tests.

EXAMPLE III

This example shows that comparable results cannot be obtained by post-adding equivalent levels (about 6 to 7%) of the starch to a homopolymer prepared by conventional emulsion polymerization using as a polymerization stabilizer an anionic/non-ionic surfactant mixture of Calsoft (dodecyl benzylsulfonate), Emcol K8300 (sodium oleoisopropylamide sulfosuccinate, and Triton X405 (ethoxylated octylphenol) or a colloid such as polyvinyl alcohol or hydroxyethyl cellulose. The test results are shown in Table II.

The results show that post-adding the starch did not provide the same heat resistance as that provided when the starch was present during the emulsion polymerization. The platen release and surface appearance were poor and it made no difference which type stabilizer was used during the polymerization. Increasing the amount of post-added starch did not improve any of the properties. The post-addition of polyvinyl alcohol did not provide satisfactory heat resistance. Only when the starch stabilizer was present during the polymerization were good heat resistance, water resistance, and adhesion obtained (see Table I).

EXAMPLE IV (comparative)

This example shows that vinyl acrylic copolymers and acrylic polymers containing the post-added starch, unlike the polyvinyl acetate homopolymer emulsions containing the post-added starch, were improved in heat-resistance. They were not improved in primer adhesion and it was necessary to add silicone to improve the board surface and resulting primer adhesion. The results are shown in Table III.

EXAMPLE V

This example shows that various additives can be post-added to the vinyl acetate homopolymer emulsions prepared using 8% of a starch stabilizer to provide improved properties. The silicone additive is typically added to improve surface properties and release (see U.S. Pat. No. 4,517,240). The starch crosslinking agents, e.g., methylolated melamine (Cymel) and glyoxal, and the hydrocarbon release additive, e.g., Resin D, are added to improve the water-resistance.

The results are in Table IV.

The post-addition of the starch stabilizer improved the surface appearance and primer adhesion but not the recovery. The conventional additives also improved the primer adhesion and generally surface appearance (except for the glyoxal). The use of these additives provides a broader operating window, and the additive selected will vary depending upon the properties desired in the treated fiberboard.

EXAMPLE VI

This example shows the advantages provided by post-adding a hydrocarbon emulsion to the starch-stabilized vinyl acetate homopolymer emulsion. The starch stabilizer was a waxy maize starch derivatized with 3% octenyl succinic anhydride. The hydrocarbon emulsions tested were as follows:

Picconol® AA-101 is an aqueous, aliphatic hydrocarbon resin emulsion available from Hercules Inc. It is based largely on low molecular weight, thermoplastic resins. It contains, as an anionic emulsifier, potassium soap of rosin. It has a viscosity at 25° C. of 50–150 cps. and a pH of 3–6.

Picconol® A-102 is an aqueous, aliphatic hydrocarbon resin emulsion available from Hercules Inc. It is based largely on low molecular weight, thermoplastic resins. It contains as an anionic emulsifier, potassium soap of rosin. It has a viscosity at 25° C. of 25–75 cps. and pH of 10–12.

Picconol® D-321 Resin is a petroleum aliphatic resin emulsion available from Hercules Inc. It contains an anionic emulsifier, a rosin soap (described as a amine salt which is a fatty acid salt of 2-amino-2-methyl-1-propanol) and rosin soaps which are potassium soap of rosin. It has a viscosity at 25° C. of 100 cps and a pH of 11.8.

Piccopale® 85-55 WKX is an aqueous, aliphatic hydrocarbon resin emulsion available from Hercules Inc. It contains an anionic emulsifier. It has a viscosity at 25° C. of 1450 cps. and a pH of 10.8.

The test results shown in Table V indicate that the addition of the hydrocarbon emulsion improves the surface appearance and primer adhesion.

Now that the preferred embodiments of the invention have been described in detail, various modifications and improvements thereon will become readily apparent to the practitioner. The spirit and scope of the invention are to be limited only by the following claims and not by the foregoing specification.

TABLE I

FIBERBOARD TREATED WITH AQUEOUS POLYVINYL ACETATE BINDER STABILIZED WITH STARCH DURING EMULSION POLYMERIZATION

| Emulsion* | Platen Release | Surface Appearance | 1-Hour Water Spot Test | Recovery | Tape Adhesion | Primer Adhesion |
|---|---|---|---|---|---|---|
| A. Derivatized waxy maize (3% OSA) | E | G to E | slight to very slight puff | G to E | E | G to E |
| B. Enzyme-converted and derivatized tapioca (85 W.F.; 7% PPO) | E | G | very slight puff | E | E | E |
| C. Acid-converted and derivatized tapioca starch (85 W.F.; 7% PPO) | E | G | slight puff | E | E | E |
| D. Acid-converted waxy maize (85 W.F.) | E | G | slight puff | E | E | E |
| E. Oxidized corn (0.5% COOH) | E | G | very slight puff | E | E | E |
| F. Dextrin (comparative) | G | P | slight puff | F | P | G |
| Control - no starch stabilizer | P | P | P | P | P | P |

*The starch stabilizer was used at 8% by weight during the vinyl acetate emulsion polymerization. The tapioca starch was acid-converted using sulfuric acid; the waxy maize starch was acid-converted using hydrochloric acid.

TABLE II

FIBERBOARD TREATED WITH AQUEOUS POLYVINYL ACETATE BINDER CONTAINING POST-ADDED STARCH STABILIZERS

| Amount of Post-Added Stabilizer | Polymerization Stabilizer | Platen Release | Surface Appearance | 1-Hour Water Spot Test | Tape Recovery | Primer Adhesion | Adhesion |
|---|---|---|---|---|---|---|---|
| 3% 85 W.F. waxy maize | Surfactant* | moderate sticking | P | slight puff | G | E | G |
| 7% 85 W.F. waxy maize | Surfactant* | considerable sticking | P | slight puff | G | P | G |
| 10% 85 W.F. waxy maize | Surfactant* | considerable sticking | P | slight puff | G | P | G |
| 3% 85 W.F. waxy maize | Polyvinyl alcohol | considerable sticking | P | slight puff | E | P | G* |
| 5% 85 W.F. waxy maize | Hydroxyethyl cellulose | considerable sticking | P | slight puff | F | P | G |
| 3% Polyvinyl Alcohol | Polyvinyl alcohol | considerable sticking | P | slight puff | E | E | G |

*Surfactant was Triton X-305 (ethoxylated octyl phenol).

TABLE III

FIBERBOARD TREATED WITH AQUEOUS POLYMERIC BINDERS STABILIZED WITH STARCH DURING EMULSION POLYMERIZATION

| Polymer | Stabilizer Present in Polymerization | Post-added | Platen Release | Surface Appearance | 1-Hour Water Spot Test | Recovery | Tape Adhesion | Primer Adhesion |
|---|---|---|---|---|---|---|---|---|
| VAc/BA/NMA | Surfactant* | 85 W.F. waxy maize (7%) | E | E | slight puff | F | E | P |
| VAc/BA/NMA | Surfactant* | None | G | Rough fiber pull | slight puff | F | E | P |
| Sty/BA/NMA | Surfactant** | 85 W.F. waxy maize (7%) | E | E | slight puff | E | E | P |
| Sty/BA/NMA | Surfactant** | None | E | Rough fiber pull | slight puff | E | E | P |
| Sty/BA/NMA & Silicone | Surfactant | Silicone Q4-3667 | E | E | slight puff | E | E | E |

VAc — vinyl acetate  BA — butyl acrylate  NMA — n-methylolacrylamide  Sty — styrene
Silicone — Q4-3667 is available from Dow Corning Corporation. It is a primary hydroxyl functional polydimethylsiloxanepolyoxyethylene copolymer with a linear structure and functionality only on the ends of the polymer chains chains. It was added in an amount of 1%, based on the weight of the polymer.
*Surfactant was Calsoft (dodecyl benzylsulfonate), Triton X-405 (ethyoxylated octylphenol), and ethoxylated phosphate ester.
**Surfactant was sodium tridecylsulfate and Triton X-405.

TABLE IV

STARCH STABILIZERS* PRESENT IN AQUEOUS EMULSION POLYMERIZATION OF VINYL ACETATE

| Starch Stabilizer* | Additive (amt.) | FIBERBOARD PROPERTIES | | | | | |
|---|---|---|---|---|---|---|---|
| | | Platen Release | Surface Appearance | 1-Hour Water Spot Test | Recovery | Tape Adhesion | Primer Adhesion |
| Waxy maize (3% OSA) | Silicone (1%) Q4-3667 | E | E | considerable spot | P | E | E |
| Waxy maize (3% OSA) | Cymel 303 (5%) | E | E | very slight puff | G | E | E |
| Waxy maize (3% OSA) | 40% Glyoxal (1%) | E | slight blisters | slight puff | G | E | E |
| Waxy maize (3% OSA) | Res. D-321 (10%) | E | E | slight puff | G | E | E |
| Waxy maize (3% OSA) | 85 WF Waxy Maize (10%) | E | E | slight puff | F | E | E |
| Waxy maize (3% OSA) | none | E | G to E | slight to very slight puff | G to E | E | G to E |

*at 8% addn. during emulsion.

TABLE V

EFFECT OF HYDROCARBON EMULSIONS ON PROPERTIES OF FIBERBASED PRESSED USING THE STARCH-STABILIZED AQUEOUS VINYL ACETATE EMULSIONS

| Hydrocarbon Emulsion** | Type | Amount | FIBERBOARD PROPERTIES | | | | | |
|---|---|---|---|---|---|---|---|---|
| | | | Platen Release | Surface Appearance | 1-Hour Water Spot Test | Recovery | Tape Adhesion | Primer Adhesion |
| Picconol | AA-101 | 10 | E | E | slight puff | E | E | E |
| Picconol | AA-101 | 30 | E | E | slight puff | E | E | E |
| Piccopale | 85-55 WKX | 10 | E | E | slight puff | E | E | E |
| Picconol | AA-101 WKX | 30 | E | E | slight puff | E | E | E |
| Picconol | AA-102 | 10 | E | E | slight puff | E | E | E |
| Picconol | AA-102 | 30 | E | E | slight puff | E | E | E |
| Res | D 321 | 10 | E | E | slight puff | E | E | E |
| Res | D 321 | 30 | E | E | very slight puff | E | E | E |
| Control*** | none | | E | G to E | slight to very slight puff | G to E | E | G to E |

*The starch stabilizer present during polymerization was the waxy maxy starch derivatized with 3% OSA.
**The hydrocarbon emulsion was post-added to sufficient aqueous polyvinyl acetate emulsion to give 100 parts
***From Table I

What is claimed is:

1. A one step process for simultaneously compressing and tempering a fiberboard panel, which comprises the step of applying to the panel prior to compression thereof an aqueous treating composition which consists essentially of (a) a polyvinyl acetate emulsion, characterized in that the emulsion is prepared in the presence of about 6–10% by weight of a starch stabilizer selected from the group consisting of a derivatized starch, a converted starch, and a derivatized and converted starch and 0.5–1.5% of a surfactant, the stabilizer and surfactant percentages being by weight based on the total weight of the monomers, (b) up to 40% of a hydrocarbon emulsion, and (c) up to 5% of a crosslinking agent, the percentage of (b) and (c) being by weight of the treating composition and totaling 100%.

2. The process of claim 1, wherein the treating composition comprises about 60–99.5% of the polyvinyl acetate polymer.

3. The process of claim 1, wherein the starch stabilizer is a derivatized corn, tapioca, or waxy maize starch present in an amount of about 8%.

4. The process of claim 3, wherein the derivatized starch is a waxy maize starch treated with up to about 3% octenyl succinic anhydride or tapioca starch derivatized with up to about 7% propylene oxide.

5. The process of claim 1, wherein the starch stabilizer is a converted corn, tapioca, or waxy maize starch.

6. The process of claim 5, wherein the converted starch stabilizer is an acid-converted or enzyme-converted tapioca or waxy maize starch having a water fluidity of about 18 to 90.

7. The process of claim 6 wherein the starch has a water fluidity of about 85.

8. The process of claim 1, wherein the starch stabilizer is a converted and derivatized starch.

9. The process of claim 8, wherein the starch is converted tapioca starch treated with propylene oxide or corn starch treated with sodium hypochlorite.

10. The process of claim 9, wherein the tapioca starch has a water fluidity of about 85 and is derivatized with 7% propylene oxide and wherein the oxidized corn starch contained about 0.5% carboxyl groups.

11. The process of claim 1, wherein the hydrocarbon emulsion is present in an amount of about 1–30%.

12. The process of claim 1, wherein the crosslinking agent is present in an amount of about 1–5%.

13. The process of claim 12, wherein the crosslinking agent is gyloxal or methylolated melamine.

14. The process of claim 1, wherein the aqueous treating composition is applied to at least one side of the fiber panel in an amount of about 0.10–3.0 dry grams per one square foot of the treated panel surface.

15. The process of claim 1, wherein the aqueous treating composition is applied in an amount of about 0.6–1.8 dry grams per one square foot of the treated panel surface and is applied to one or both sides of the fiber board panel.

16. The fiberboard produced by the process of claim 1.

* * * * *